US008462069B2

(12) United States Patent
Tesh et al.

(10) Patent No.: US 8,462,069 B2
(45) Date of Patent: Jun. 11, 2013

(54) ACCESSORY SYSTEM WITH INTEGRATED MULTIBAND ANTENNA

(75) Inventors: Mark A. Tesh, Forest, VA (US); Brian D. Justin, Jr., Forest, VA (US)

(73) Assignee: Harris Corporation, Melbourne, FL (US)

( * ) Notice: Subject to any disclaimer, the term of this patent is extended or adjusted under 35 U.S.C. 154(b) by 210 days.

(21) Appl. No.: 13/088,658

(22) Filed: Apr. 18, 2011

(65) Prior Publication Data
US 2012/0262350 A1 Oct. 18, 2012

(51) Int. Cl.
*H01Q 9/16* (2006.01)
*H01Q 1/00* (2006.01)

(52) U.S. Cl.
USPC .......................................... 343/792; 343/720

(58) Field of Classification Search
USPC .................. 343/718, 720, 792, 793
See application file for complete search history.

(56) References Cited

U.S. PATENT DOCUMENTS

| 3,370,236 A | 2/1968 | Walker |
| 7,671,818 B2 * | 3/2010 | Nagano et al. ................. 343/850 |
| 7,755,553 B2 * | 7/2010 | Packer et al. ................. 343/718 |
| 8,094,859 B2 * | 1/2012 | Suematsu et al. ............. 381/384 |
| 2006/0166719 A1 | 7/2006 | Arad et al. |

FOREIGN PATENT DOCUMENTS

| JP | 60 249403 A | 12/1985 |
| JP | 2000349868 A | 12/2000 |
| JP | 2005333459 A | 12/2005 |

OTHER PUBLICATIONS

European Search Report mailed Nov. 21, 2012; Application Serial No. 12002450.0-2220/2515374 in the name of Harris Corporation.

\* cited by examiner

*Primary Examiner* — Robert Karacsony
*Assistant Examiner* — Hasan Islam
(74) *Attorney, Agent, or Firm* — Fox Rothschild, LLP; Robert J. Sacco

(57) ABSTRACT

An accessory system (202, 402, 502) for a portable radio transceiver (200) includes an accessory device (206) which includes a speaker and/or a microphone disposed external of the portable radio transceiver. A cable (204) containing two or more conductors is provided for operatively connecting the accessory device to the portable radio transceiver. At least one antenna (210, 212) for the portable radio transceiver is integrated within the cable. When the accessory system is used with a multi-band portable radio transceiver, two or more antennas can be included in the cable, each optimized for operation on a particular RF frequency band.

23 Claims, 3 Drawing Sheets

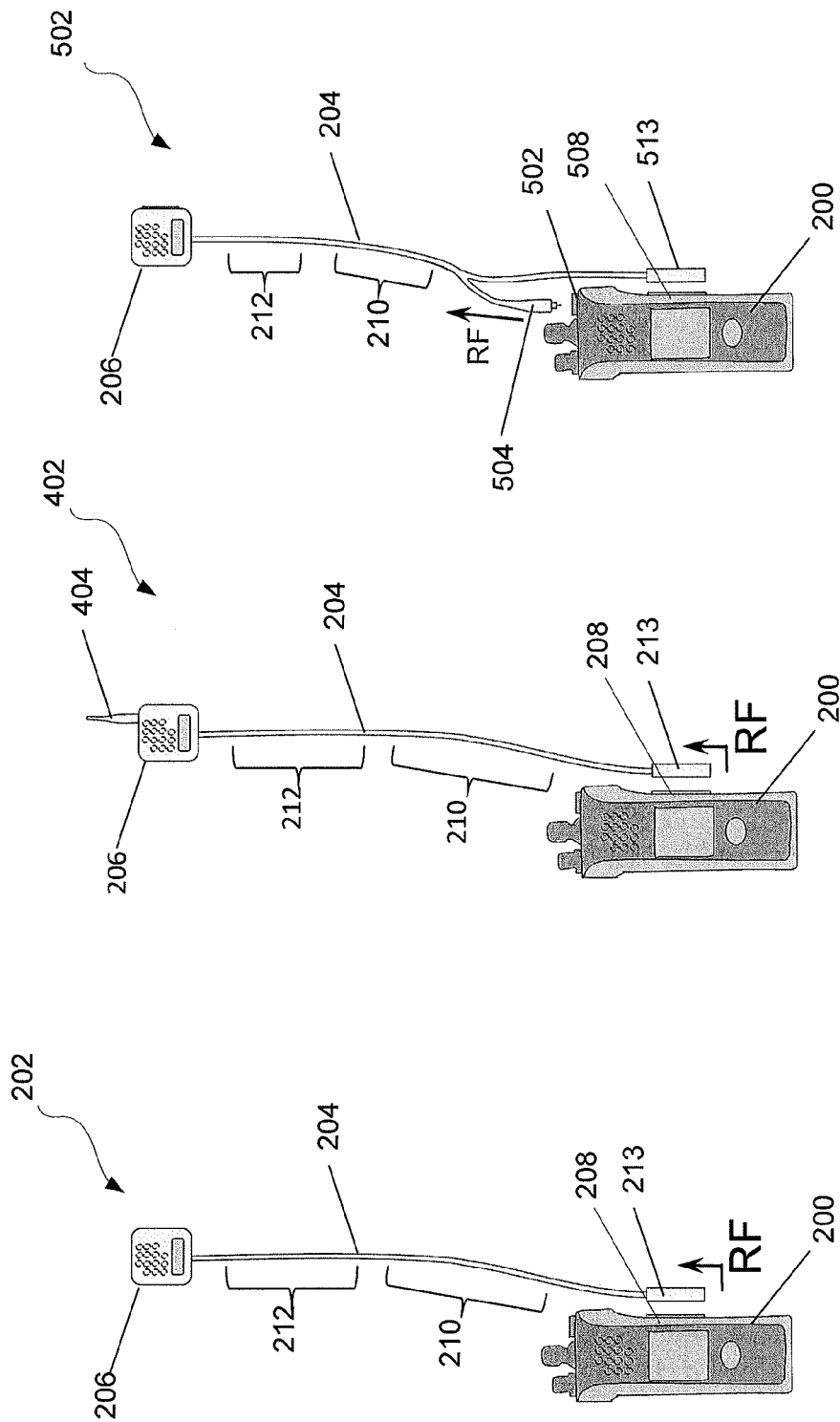

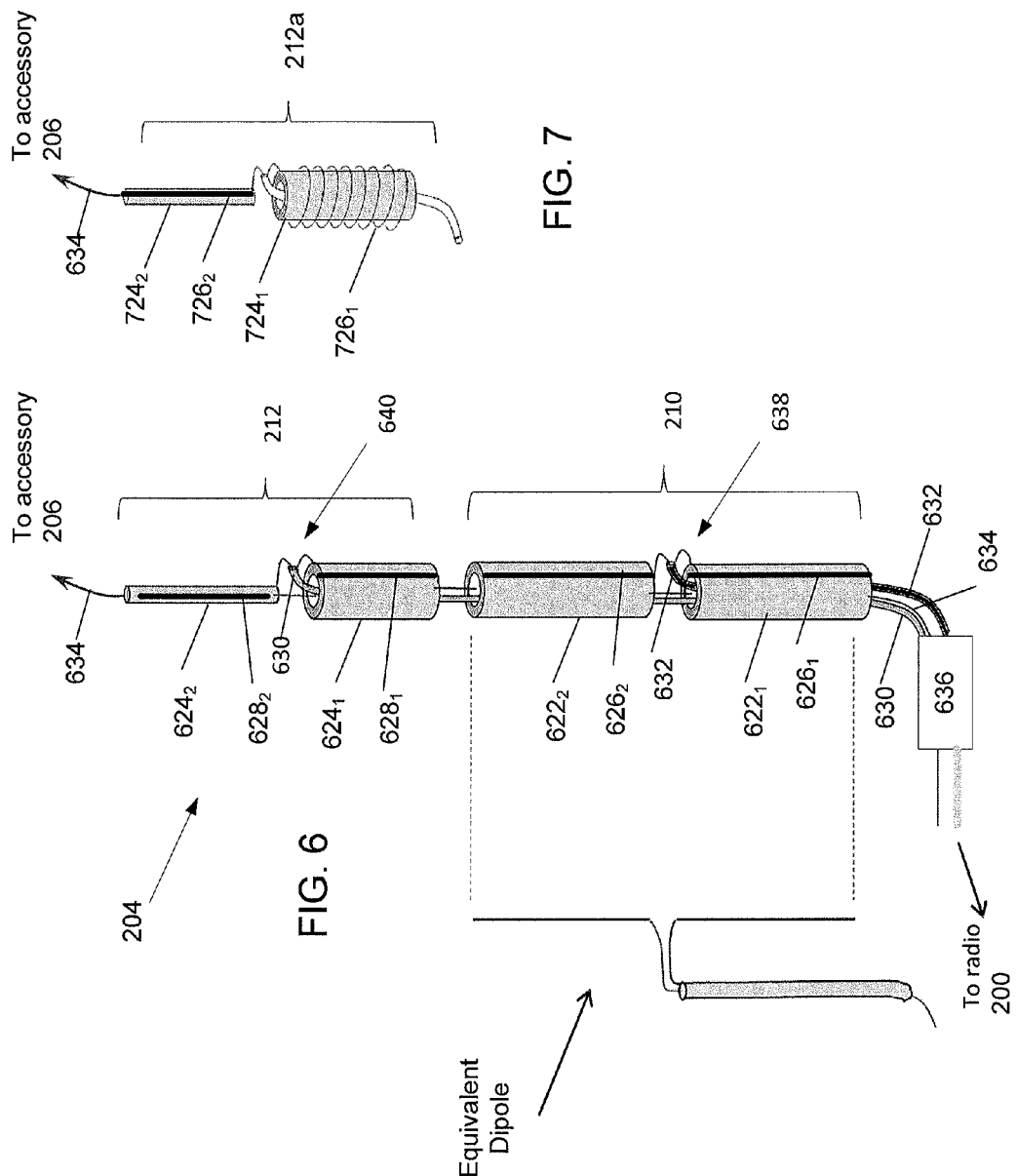

_US 8,462,069 B2_

ACCESSORY SYSTEM WITH INTEGRATED MULTIBAND ANTENNA

BACKGROUND OF THE INVENTION

1. Statement of the Technical Field

The inventive arrangements relate to antennas, and more particularly to methods and systems for adapting multi-band antennas for portable handheld transceivers.

2. Description of the Related Art

Multiband hand-held portable radios are rapidly becoming popular among tactical and public safety radio users. The antennas used for these multiband radios are usually flexible multi-element whip antennas. Multiple elements are required within the antenna to provide functionality on the various different frequencies at which the multi-band radio operates. For example, at least three separate antenna elements can be used to operate the antenna on the VHF, UHF, and 700/800 MHz bands. Although such antennas work reasonably well, they are often relatively large, to accommodate the wide range of frequencies employed. In fact, users who are experienced with single-band radios often complain the multiband antennas are too long and interfere with user mobility.

Current antenna development is focused on making antennas smaller, including plans to reduce performance in the least-used band in exchange for smaller size elements. However, smaller sized antennas almost inevitably lead to reduced performance; and the advantage of multi-band radios is diminished if performance on some bands is sacrificed merely to facilitate smaller antenna size.

Many portable radios are designed for use with an accessory item such as a speaker-microphone. The portable radio is designed to be attached to the user's belt, to accommodate the size and weight of the radio, whereas the smaller and lighter accessory item can located in a more convenient location. For example, speaker-microphones are often worn at the shoulder, where the user can more easily hear the audio they produce and communicate speech audio to the microphone. Some designers have taken advantage of the speaker-microphone by mounting on it a small additional antenna, usually for the 700-800 MHz band of a multi-band radio. The antenna in such designs is usually mounted directly to the housing of the speaker microphone. This arrangement improves coverage, but does not improve multiband performance. Indeed, remote antennas mounted on speaker microphones must be small because of proximity to the user's face and ears.

SUMMARY OF THE INVENTION

Embodiments of the invention concern an accessory system for a portable radio transceiver. The accessory system includes an accessory device. The accessory device can be a speaker and/or a microphone disposed external of the portable radio transceiver, or any other type of accessory to enhance operation of the portable radio transceiver. A cable containing two or more conductors is provided for operatively connecting the accessory device to the portable radio transceiver. At least one antenna for the portable radio is integrated within the cable. For example, two or more antennas can be integrated within the cable. Each antenna can be optimized for operating on the same or different frequency bands of the portable radio transceiver. If operated on the same band, the two or more antennas can configured to operate in phase, so as to form a phased array.

If the two or more antennas are optimized for different bands, a multiplexer is advantageously provided within the cable or its connectors. The multiplexer is configured for routing signals to and from the portable radio transceiver to a respective one of the two or more antennas. A further antenna can be disposed on the housing of the accessory device.

According to another aspect of the invention, the two or more antennas disposed within the cable are dipoles. The dipoles are advantageously arranged to form a collinear array disposed within or along a length of the cable. The dipoles can be fed so as to operate essentially independently of one another, or can be fed so as to form a phased array, wherein the two or more antenna elements are fed in phase.

The cable can be comprised of two or more tubular elements which are flexible. Each of the dipoles is comprised of two or more radiating elements which are supported on the tubular elements. Alternatively, the dipole radiating elements can be integrated with the tubular elements. The two or more conductors are advantageously routed through a central bore formed respectively in each of the two or more tubular elements. The antenna feed lines for the various antennas can also be routed through the central bore of the tubular elements.

The cable can have a single common connector to connect the cable to the portable radio transceiver. In that case, signals associated with the accessory device and signals associated with the antennas can all be communicated to the cable through the single connector. Alternatively, the cable has at least two separate connectors at an end distal from the accessory device. A first connector is configured for coupling the cable to a port on the portable radio which communicates signals to and from the accessory. A second connector is configured for coupling an antenna port of the portable radio transceiver to the antennas.

BRIEF DESCRIPTION OF THE DRAWINGS

Embodiments will be described with reference to the following drawing figures, in which like numerals represent like items throughout the figures, and in which:

FIG. 3 is a drawing that shows the integrated antenna of FIG. 2 in greater detail.

FIG. 4 is a drawing that shows a first alternative embodiment of the integrated antenna in FIG. 3.

FIG. 5 is a drawing that shows a second alternative embodiment of the integrated antenna in FIG. 3.

FIG. 6 is a drawing that is useful for understanding a construction of the antenna in FIGS. 3, 4 and 5.

FIG. 7 is a drawing which is useful for understanding an antenna including a helical element.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Figure 1:
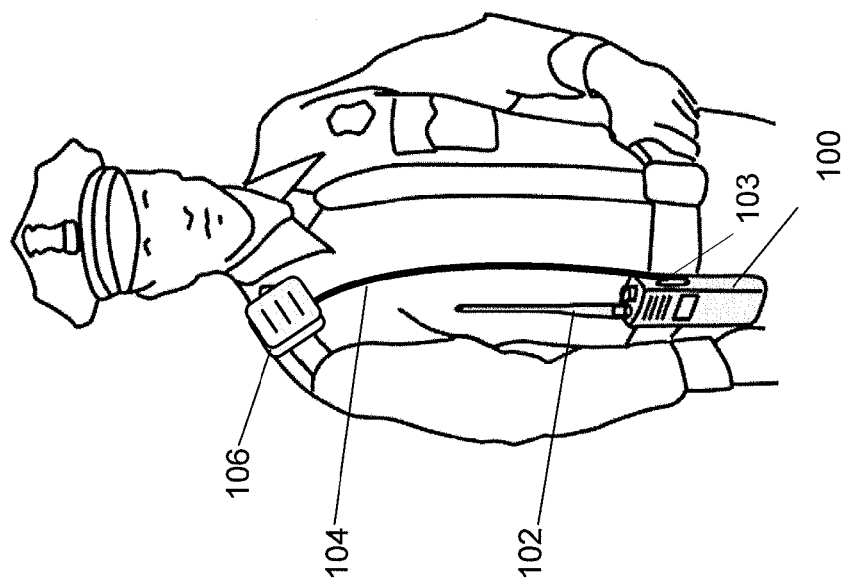
FIG. 1 a drawing that is useful for understanding a prior art antenna arrangement for a multi-band portable handheld transceiver.

Referring now to FIG. 1, there is shown a conventional multi-band portable radio transceiver 100 with a multi-band whip antenna 102. For example, and without limitation, the transceiver may be designed to operate on the VHF, UHF, and 700/800 MHz bands. Radio frequency (RF) signals for each of these RF frequency bands are communicated to and from the antenna 102 through an RF antenna port of the transceiver. It is common for a transceiver 100 to be used with an accessory device 106 which is electrically connected to the transceiver by means of a cable 104. An accessory device 106 that is commonly used with a transceiver 100 is a combination speaker and microphone which is sometimes referred to as a "speaker-mic". The cable 104 contains two or more conductors for operatively connecting the accessory device to the portable radio transceiver. Typically, the cable 104 will have a connector provided on an end distal from the accessory device for establishing an electrical connection with an accessory port 103 of transceiver 100. The accessory port 103 is generally arranged so that it is separate from the antenna port. While the foregoing arrangement provides acceptable results, users frequently object to the relatively large size of multi-band whip antennas 102 which are designed for use with multi-band portable transceivers. Specifically many users find that such relatively large size multi-band antennas can interfere with comfort and mobility.

Figure 2:
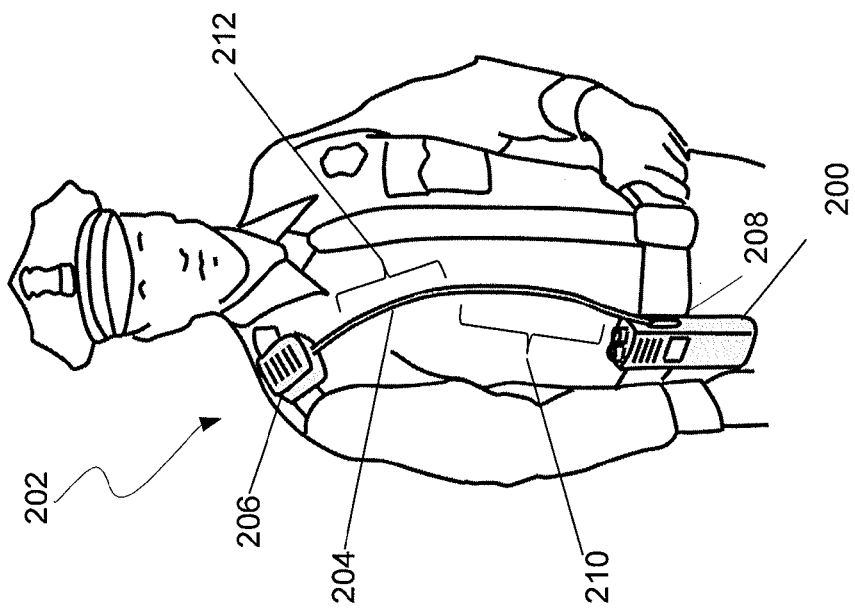
FIG. 2 is a drawing that is useful for understanding an accessory device with an integrated antenna for multiband operation.

A solution to the foregoing problem is presented in FIG. 2, which shows a portable multi-band transceiver 200 including an accessory system 202 with accessory device 206. The accessory device 206 is operatively connected to the accessory port 208 of transceiver 200 by means of a flexible cable 204. The cable 204 contains two or more conductors for operatively connecting the accessory device 206 to the portable radio transceiver. In some embodiments, the accessory device can at least include a speaker microphone, although the invention is not limited in this regard. For example, the accessory device could also be a GPS unit or any other external accessory that is useful to enhance the operation of the transceiver 200. The accessory device 206 can also include remote controls for operating the various functions and features of the transceiver 200. For example, channel selection, push-to-talk switches, and volume control can all be included in the accessory device 206. The accessory device 206 in some embodiments can also include a small display to facilitate interaction with the operation or the radio transceiver 200. According to a preferred embodiment, the accessory device 206 is a wearable accessory device. The accessory device is wearable if it has a small lightweight design with a suitable clip for attachment to the user, or an article of clothing worn by the user. Speaker microphones in particular are wearable accessory devices for portable radio transceivers.

According to an embodiment of the invention, one or more antennas 210, 212 are integrated within the cable 204 In the embodiment shown in FIG. 2, only two antennas are shown integrated into the cable 204; but it should be understood that the invention is not intended to be limited in this regard. RF energy communicated to and from transceiver 200 is coupled by way of accessory port 208 to the one or more antennas 210, 212. The integration of the one or more antennas within the cable 204 eliminates the mobility and discomfort problems associated with a separate multiband antenna 102. Notably, conventional antenna development is generally focused on making multi-band antennas smaller, including plans to reduce performance in the least-used band in exchange for smaller size. In contrast, the arrangement in FIG. 2 allows the antenna to become integrated with a cable to a wearable accessory, such as a speaker-microphone 206. With this innovative feature, the antenna can be relatively long without causing discomfort or loss of mobility for the user.

Various embodiments of the invention will now be described in further detail with respect to FIGS. 3-5, which show three different embodiments of the accessory system 202, 402, 502. As illustrated in FIG. 3, the available length of the cable 204 allows one or more antennas 210, 212 for each band of interest. This arrangement can improve comfort and mobility of the user, but also has the potential to improve RF performance and geographic coverage provided by the transceiver. For example, in some embodiments of the invention, two or more antenna 210, 212 can be optimized for operating on the same or different frequency bands of the portable radio transceiver 200. When configured for in-phase operation on the same frequency band, the two or more collinear antennas can provide additional gain as compared to operations with a single antenna. This feature will be described in further detail as the discussion progresses.

As shown in FIG. 4, accessory system 402 can include a further antenna 400 disposed on the housing of the accessory device 206. An RF multiplexer (not shown) is advantageously provided within the cable 204, a connector 513 used to connect the cable to the accessory port 208, or within the accessory port 208. The multiplexer is advantageously configured for routing signals to and from the portable radio transceiver 200 to the appropriate antenna(s) 210, 212 within the cable 204, and/or to the antenna 400 mounted on the accessory device.

As will be understood from FIGS. 3 and 4, the integration of one or more antennas 210, 212 within an accessory cable 204 can in some embodiments involve the use of an accessory port 208 which includes RF connectors to form an antenna port. In such embodiments, the antenna port for transceiver 200 can be fully integrated with the accessory port 208. Similarly, a connector 213 can include electrical connections for an accessory device and one or more antennas integrated into cable 204. Consequently, attachment of the connector 213 to the accessory port 208 can provide all of the necessary connections to facilitate operation of the accessory device 206 and one or more antennas 210, 212, 400.

Still, it can in some instances be desirable to use the accessory device 206 with integrated antennas 210, 212 in transceivers which were designed exclusively for operations with a separate whip antenna 102. In such instances, an accessory port 508 will not include the necessary RF connections for an antennas 210, 212. In order to overcome this problem, a separate antenna connector can be provided on cable 204 to facilitate connection of the accessory cable 204 with the antenna port. More particularly, with reference to FIG. 5, the accessory system 502 can include a cable 204 with an RF connector 504 which is configured to mate with an antenna port RF connector 502, and a connector 513 for connecting the cable to an accessory port 508. Consequently, the accessory device 206 with integrated antennas can be used with existing transceivers 200 that are not capable of communicating RF signals through an accessory port 508. More particularly, RF signals to and from antennas 210, 212, 400 can be routed to the antenna connector 504, and signals for facilitating operation of accessory device 206 can be routed through accessory connector 513.

Turning now to FIG. 6, the construction of the cable 204 will now be described in further detail. The cable 204 can include one or more antennas. For convenience, only two antennas 210, 212 are shown in FIG. 7; however the invention is not intended to be limited in this regard. According to one embodiment of the invention, a first antenna 210 can be a dipole antenna which is coupled to a feed line 632. A second antenna 212 can be a dipole antenna 212 coupled to a feed line 630. The dipoles can be advantageously arranged to form a collinear array disposed within or along a length of the cable. For purposes of the present invention, vertical dipole antennas are preferred because they are balanced antenna designs, and therefore do not require a counterpoise in order to operate effectively. Accordingly, the dipole antennas can be mounted spaced apart from the body of transceiver 200 without adversely effecting the performance of such antennas. Still, the invention is not limited in this regard, and in some embodiments, the first antenna 210 can be a monopole antenna, and second antenna 212 can be a dipole antenna. For example, antenna 210 can be configured as a monopole antenna if it is located at or very near to the chassis ground defined by the body of the portable radio transceiver 200.

In some embodiments, a collinear array of antennas integrated in cable 204 can be respectively optimized for operation on the same first and second frequency bands of the transceiver 200. If the antennas 210, 212 are optimized for operation on the same frequency band, the first and second antennas 210, 212 can be arranged to function together as an in-phase or phased collinear array. As will be appreciated by those skilled in the art, a properly configured phased collinear array can produce an increase in gain (as compared to a single dipole antenna), in a direction generally transverse to the length of the antennas. The arrangement and phasing of collinear arrays are well known in the art and therefore will not be described here in detail However, it should be understood that any suitable feeding and phasing arrangement can be used.

In other embodiments, the plurality of antennas forming the collinear array can be respectively optimized for operation on different frequency bands, such that the plurality of antennas can each operate substantially independently of the other. It should be appreciated that for those instances when the plurality of antennas are intended to operate independently on separate RF frequency bands, a multiplexer 636 can advantageously be used to route the RF signals for each frequency band to correct antenna. For example, the multiplexer can route RF signals for a first frequency band to the first antenna 210, and can route RF signals for a second frequency band to the second antenna 212. The multiplexer can be comprised of a separate unit or can be integrated into the overall antenna design using proper impedance selection.

According to one embodiment shown in FIG. 6, the cable 204 can be comprised of one or more tubular elements $622_1$, $622_2$, $624_1$, $624_2$. The tubular elements can provide structure and support to the various antenna elements described herein; but they are not necessary for the purposes of the invention and any other suitable mechanical arrangement can also be used. If used, the tubular elements $622_1$, $622_2$, $624_1$, $624_2$ are advantageously formed of a flexible material, but the invention is not limited in this regard. One or more antenna feed lines 630, 632 communicate RF energy to and from the plurality of antennas 210, 212. In some embodiments, the feed lines 630, 632 can be routed through a central bore formed in the tubular elements as shown. Electrical wiring 634, which can include a plurality of conductors, can similarly be routed through the tubular elements to facilitate operation of the accessory device 206. If one or more additional antennas 404 are mounted on the accessory device 206, then the antenna feed line for that antenna (not shown) can also be routed through the tubular elements $622_1$, $622_2$, $624_1$, $624_2$.

According to a preferred embodiment, suitable decoupling components (not shown) can be provided to decouple the RF communicated to the antennas 210, 212 from the electrical wiring 634. Such decoupling components can include, but are not limited to, RF shunts, RF isolating or ferrite-based decoupling circuits. Techniques and components for RF decoupling are well known in the art and therefore will not be described here in detail. In general, however, such components should be arranged to ensure that RF signals communicated to the antennas do not interfere with signals communicated with electrical wiring 634.

One or more of the plurality of antennas 210, 212 can be advantageously configured as dipole antennas. Such dipole antennas are respectively comprised of two radiating elements $626_1$, $626_2$ and $628_1$, $628_2$ which extend in opposing directions from feed point 638, 640 as shown. The feed points are preferably in the approximate center of each dipole antenna such that the length of each radiating element for a particular antenna 210, 212 is approximately equal. Still, the invention is not limited in this regard and off-center-fed dipole antennas can also be used with the present invention. In the case of an off-center-fed dipole, the radiating elements $626_1$, $626_2$ and $624_1$, $624_2$ can be of different lengths.

In FIG. 6, the radiating elements $626_1$, $626_2$ and $628_1$, $628_2$ are shown as conductive metal traces disposed on the exterior of the tubular elements; however, it should be appreciated that the invention is not limited in this regard. The radiating elements $626_1$, $626_2$ and $628_1$, $628_2$ can be formed of a conductor disposed on or adjacent to the exterior of the tubular elements $622_1$, $622_2$, $624_1$, $624_2$. For example, the radiating elements can be formed of conductive tape or a relatively small diameter conductive metal wire, a conductive metal trace disposed directly on the tubular elements, or a metal foil extending circumferentially around all or a portion of the tubular elements. According to yet another embodiment, the tubular elements can themselves be formed of a relatively soft metal, such as copper. In that case, the tubular elements can be integrally formed with the radiating elements.

One or more of the radiating elements $626_1$, $626_2$ and $628_1$, $628_2$ can be formed as helical elements. Such an arrangement is illustrated in FIG. 7, which shows antenna 212a. In FIG. 7, helical element $726_1$ is disposed around an exterior of the tubular element $724_1$. A second radiating element $726_2$ is disposed on an exterior of tubular element $724_2$.

Applicants present certain theoretical aspects above that are believed to be accurate that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. An accessory system for a portable radio transceiver, comprising:
    an accessory for a portable radio transceiver comprising at least one of a speaker and a microphone disposed external of said portable radio transceiver;
    a cable containing a non-conductive outer sheath covering electrical wiring for operatively connecting said accessory to said portable radio transceiver;
    a plurality of tubular support elements separate from said electrical wiring and disposed within said non-conductive outer sheath, said plurality of tubular support elements serially arranged to extend for at least a portion of a length of said cable, where each of said plurality of tubular support elements is spaced a pre-defined distance from an immediately adjacent tubular support element and has a central bore formed therein through which said electrical wiring passes;
    at least one vertical dipole antenna integrated within said cable so as to be spaced apart from a body of said portable radio transceiver, said vertical dipole antenna comprising two radiating elements which extend in opposing directions from a feed point, each said radiating element formed of an elongate conductor disposed on a portion of an external surface of a respective tubular support element of said plurality of tubular support elements such that said elongate conductor extends parallel to a center axis of said respective tubular support element; and
    at least one feed line configured to communicate energy to and from said vertical dipole antenna, said feed line routed through said central bore of at least one of said plurality of tubular support elements which resides closest to said body of said portable radio transceiver.

2. The accessory system according to claim 1, wherein a plurality of antennas are integrated within said cable, each optimized for operating on at least one frequency band of said portable radio transceiver.

3. The accessory system according to claim 2, wherein a first one of said plurality of antennas is optimized for operating on a first frequency band, and a second one of said plurality of antennas is optimized for operating on a second frequency band different from the first frequency band.

4. The accessory system according to claim 2, wherein a first and second one of said plurality of antennas are respectively optimized for operating on the same frequency band.

5. The accessory system according to claim 2, further comprising a multiplexer configured for routing signals from said portable radio transceiver to said plurality of antennas.

6. The accessory system according to claim 2, wherein said plurality of antennas are dipoles.

7. The accessory system according to claim 6, wherein said dipoles are arranged to form a collinear array disposed along a length of said cable.

8. The accessory system according to claim 7, wherein said dipoles in said collinear array are configured to operate in phase.

9. The accessory system according to claim 6, wherein said plurality of tubular support elements are flexible.

10. The accessory system according to claim 9, wherein each of said dipoles is comprised of a plurality of radiating elements which are supported on said tubular support elements.

11. The accessory system according to claim 1, further comprising at least a second antenna mounted to said accessory.

12. The accessory system according to claim 1, wherein said cable comprises at least two separate connectors at an end distal from said accessory, including a first connector configured for coupling said cable to an accessory port of said portable radio which communicates signals to and from said accessory, and a second connector configured for coupling an antenna port of said portable radio transceiver to said at least one antenna.

13. An accessory system for a portable radio transceiver that operates on multiple bands, comprising:
    an accessory for a portable radio transceiver comprising at least one of a speaker and a microphone disposed external of said portable radio transceiver;
    a cable containing a non-conductive outer sheath covering electrical wiring for operatively connecting said accessory to said portable radio transceiver;
    a plurality of tubular support elements separate from said electrical wiring and disposed within said non-conductive outer sheath, said plurality of tubular support elements serially arranged to extend for at least a portion of a length of said cable, where each of said plurality of tubular support elements is spaced a pre-defined distance from an immediately adjacent tubular support element and has a central bore formed therein through which said electrical wiring passes;
    a plurality of vertical dipole antennas arranged to form a collinear array integrated within said cable, at least one dipole of said vertical dipole antennas comprising two radiating elements which extend in opposing directions from a feed point, each said radiating element formed of an elongate conductor disposed on a portion of an external surface of a respective tubular support element of said plurality of tubular support elements such that said elongate conductor extends parallel to a center axis of said respective tubular support element; and at least one feed line configured to communicate energy to and from said dipole, said feed line routed through said central bore of at least one of said plurality of tubular support elements which resides closest to said body of said portable radio transceiver;

wherein each of said plurality of antennas is optimized for at least one RF frequency band of said portable radio transceiver.

14. The accessory system according to claim 13, further comprising a multiplexer configured for routing signals from said portable radio transceiver to said plurality of vertical dipole antennas.

15. The accessory system according to claim 13, wherein a first one of said plurality of vertical dipole antennas is optimized for operating on a first frequency band, and a second one of said plurality of vertical dipole antennas is optimized for operating on a second frequency band different from the first frequency band.

16. The accessory system according to claim 13, wherein a first and second one of said plurality of vertical dipole antennas are respectively optimized for operating on the same frequency band.

17. The accessory system according to claim 16, wherein said first and second vertical dipole antennas are configured for operating in phase.

18. The accessory system according to claim 13, wherein said plurality of tubular elements which are flexible.

19. The accessory system according to claim 13, wherein each of said plurality of vertical dipole antennas is comprised of a plurality of radiating elements which are supported on said tubular support elements.

20. The accessory system according to claim 13, further comprising at least a third antenna mounted to said accessory.

21. The accessory system according to claim 13, wherein said cable comprises at least two separate connectors at an end distal from said accessory, including a first connector configured for coupling said cable to an accessory port on said portable radio which communicates signals to and from said accessory, and a second connector configured for coupling said cable to an antenna port, separate from said first port, for communicating RF signals to and from said plurality of vertical dipole antennas.

22. An accessory system for a portable radio transceiver that operates on multiple bands, comprising:

an accessory device for enhancing an operation of a portable radio transceiver, disposed external of said portable radio transceiver;

a cable containing a non-conductive outer sheath covering electrical wiring for operatively connecting said accessory device to said portable radio transceiver;

a plurality of tubular support elements separate from said electrical wiring and disposed within said non-conductive outer sheath, said plurality of tubular support elements serially arranged to extend for at least a portion of a length of said cable, where each of said plurality of tubular support elements is spaced a pre-defined distance from an immediately adjacent tubular support element and has a central bore formed therein through which said electrical wiring passes;

a plurality of vertical dipole antennas for said portable radio arranged to form a collinear array integrated within said cable, at least one of said vertical dipole antennas comprising two radiating elements which extend in opposing directions from a feed point, each said radiating element formed of an elongate conductor disposed on a portion of an external surface of a respective tubular support element of said plurality of tubular support elements such that said elongate conductor extends parallel to a center axis of said respective tubular support element; and at least one feed line configured to communicate energy to and from said vertical dipole antenna, said feed line routed through said central bore of at least one of said plurality of tubular support elements which resides closest to said body of said portable radio transceiver;

wherein each of said dipole antennas is optimized for at least one RF frequency band of said portable radio transceiver; and wherein said cable includes at least two separate connectors at an end distal from said accessory, including a first connector configured for coupling said cable to a first port on said portable radio transceiver which communicates signals to and from said accessory device, and a second connector configured for coupling said cable to a second port on said portable radio transceiver, separate from said first port, for communicating RF signals to and from said plurality of vertical dipole antennas within said cable.

23. The accessory system according to claim 22, further comprising at least a third antenna mounted to said accessory.

* * * * *